United States Patent
Pillai et al.

(10) Patent No.: US 12,468,613 B2
(45) Date of Patent: Nov. 11, 2025

(54) SYSTEMS AND METHODS FOR DETECTING HARDWARE TAMPERING USING AIRFLOW SENSORS

(71) Applicant: Cisco Technology, Inc., San Jose, CA (US)

(72) Inventors: Harikrishnan Pillai, San Jose, CA (US); Niels-Peder Mosegard Jensen, Sunnyvale, CA (US); Jeffrey C. Loo, San Jose, CA (US); Phong Hoang Ho, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 368 days.

(21) Appl. No.: 18/165,643

(22) Filed: Feb. 7, 2023

(65) Prior Publication Data

US 2024/0264920 A1 Aug. 8, 2024

(51) Int. Cl.
*G06F 11/30* (2006.01)
*G06F 21/86* (2013.01)

(52) U.S. Cl.
CPC .......... *G06F 11/3058* (2013.01); *G06F 21/86* (2013.01); *G06F 2221/2151* (2013.01)

(58) Field of Classification Search
CPC .. G01P 5/00; G01P 5/06; G01N 29/00; G01N 29/24; G08B 13/00; G08B 13/14; G06F 21/00; G06F 21/86; H05K 5/00; H05K 5/03; G07F 9/00; G07F 19/00; H04L 63/00; H04L 63/14; G01D 5/00; G01D 21/00; G01R 31/00; G01R 31/28; H04W 12/00; G05B 19/00; G05B 23/00; F24F 11/00
See application file for complete search history.

(56) References Cited

U.S. PATENT DOCUMENTS

| | | | |
|---|---|---|---|
| 4,197,530 A * | 4/1980 | Fletcher | G08B 13/26 331/65 |
| 5,208,587 A * | 5/1993 | Cornman | G01S 7/003 340/963 |
| 9,740,888 B1 | 8/2017 | Aga et al. | |
| 10,127,409 B1 * | 11/2018 | Wade | G06F 21/75 |
| 2007/0143462 A1 * | 6/2007 | Venkatachalam | G06F 21/554 709/223 |
| 2008/0252450 A1 * | 10/2008 | Wandel | B65D 55/026 340/541 |
| 2009/0230305 A1 | 9/2009 | Burke et al. | |

(Continued)

OTHER PUBLICATIONS

Paul Staat, Johannes Tobisch, Christian Zenger, and Christof Paar "Anti-Tamper Radio: System-Level Tamper Detection for Computing Systems"; Max Planck Institute for Security and Privacy; PHYSEC GmbH, Bochum, Germany arXiv:2112.09014v1 [cs.CR], Dec. 16, 2021, 15 pages.

(Continued)

*Primary Examiner* — Christopher C Harris
(74) *Attorney, Agent, or Firm* — Baker Botts L.L.P.

(57) ABSTRACT

In one embodiment, a method includes receiving airflow data from an airflow sensor installed inside of a hardware device and determining an airflow value from the airflow data. The method also includes determining that the airflow value exceeds a predetermined threshold. The method further includes determining a potential tampering event associated with the hardware device.

17 Claims, 3 Drawing Sheets

(56) References Cited

U.S. PATENT DOCUMENTS

| | | | |
|---|---|---|---|
| 2009/0295581 A1* | 12/2009 | Paananen | G08B 13/1436 |
| | | | 340/572.1 |
| 2010/0031368 A1* | 2/2010 | Park | G11B 23/28 |
| | | | 726/26 |
| 2011/0018713 A1* | 1/2011 | Yehoshua | G06F 21/86 |
| | | | 340/572.3 |
| 2013/0249691 A1* | 9/2013 | Bertoni | G06F 21/86 |
| | | | 340/541 |
| 2015/0269805 A1* | 9/2015 | Korala | G06F 21/83 |
| | | | 713/194 |
| 2017/0032149 A1 | 2/2017 | Sengupta et al. | |
| 2018/0023989 A1* | 1/2018 | Droin | G01N 29/024 |
| | | | 73/861.04 |
| 2018/0234266 A1 | 8/2018 | Rudolph et al. | |
| 2018/0253569 A1 | 9/2018 | Swierk et al. | |
| 2019/0095657 A1* | 3/2019 | Norton | G06F 21/86 |
| 2019/0158789 A1 | 5/2019 | Snyder et al. | |
| 2019/0362080 A1* | 11/2019 | Achillopoulos | G06F 21/72 |
| 2020/0258358 A1* | 8/2020 | Beck | G06F 21/86 |
| 2021/0225159 A1* | 7/2021 | Grobelny | G08B 29/16 |
| 2022/0114870 A1 | 4/2022 | Beck | G08B 13/06 |
| 2022/0192011 A1* | 6/2022 | Zhang | H05K 3/4647 |
| 2023/0104923 A1* | 4/2023 | Lu | H04L 63/1425 |
| | | | 726/4 |
| 2023/0419797 A1* | 12/2023 | Hollins | G08B 13/149 |
| 2024/0111912 A1* | 4/2024 | Wesneski | G06F 21/86 |

OTHER PUBLICATIONS

International Search Report and Written Opinion for International Application No. PCT/US2024/013488, mailed May 14, 2024, 13 Pages.

* cited by examiner

SYSTEMS AND METHODS FOR DETECTING HARDWARE TAMPERING USING AIRFLOW SENSORS

TECHNICAL FIELD

The present disclosure relates generally to communication networks, and more specifically to systems and methods for detecting hardware tampering using airflow sensors.

BACKGROUND

One of the key challenges with ensuring hardware system security is preventing attackers that have physical possession of a hardware system from modifying the hardware when the system is powered off. For example, the attacker may modify the contents of storage/boot devices by attaching debuggers or other mechanisms to reverse engineer the contents. As another example, the attacker may use man-in-the-middle attacks to gain information about the system's security.

DESCRIPTION OF EXAMPLE EMBODIMENTS

Overview

Figure 1:
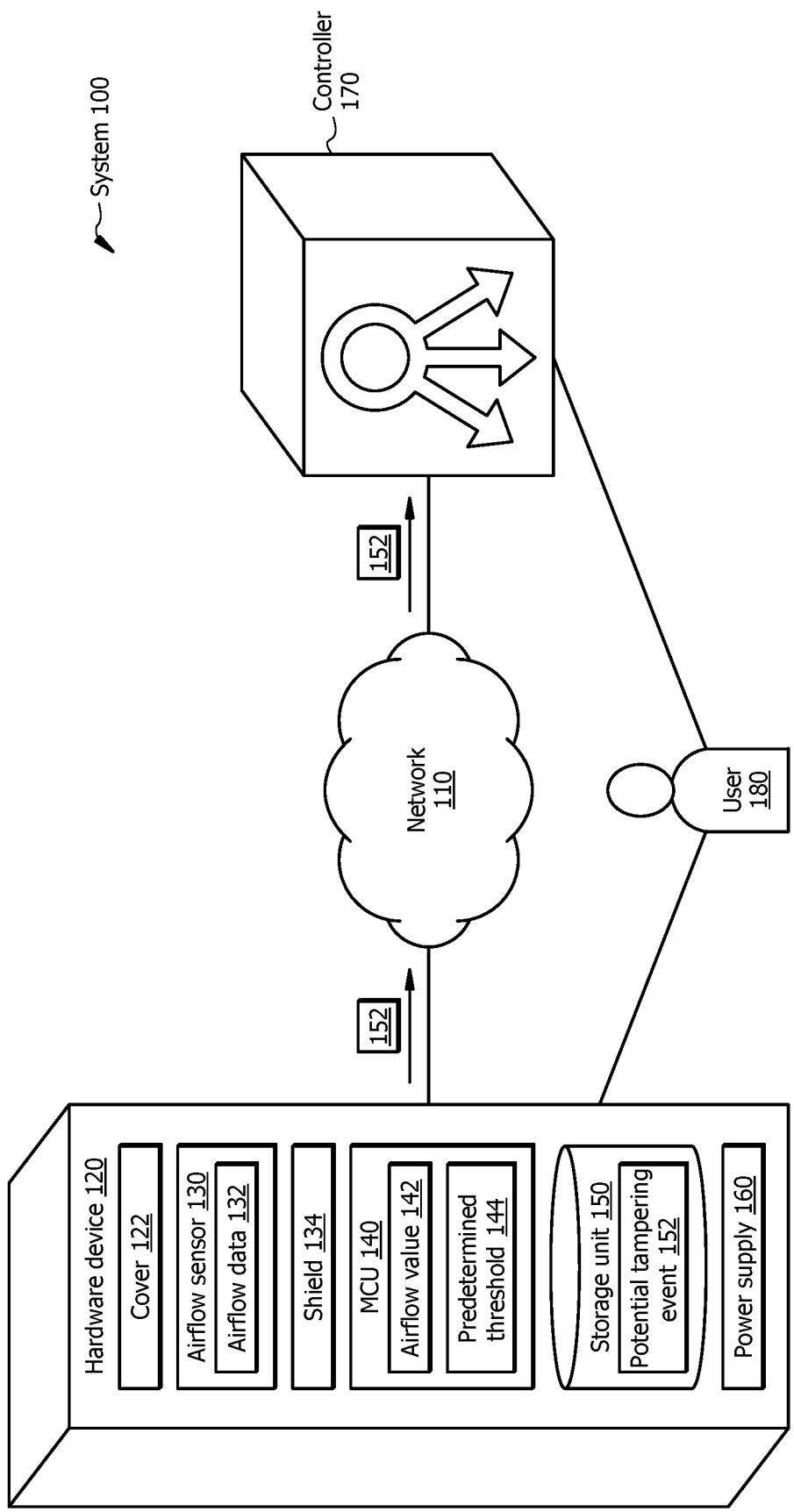
FIG. 1 illustrates a system for detecting hardware tampering using an airflow sensor, in accordance with certain embodiments.

According to an embodiment, a network element includes one or more processors and one or more computer-readable non-transitory storage media coupled to the one or more processors and including instructions that, when executed by the one or more processors, cause the network element to perform operations. The operations include receiving airflow data from an airflow sensor installed inside of a hardware device and determining an airflow value from the airflow data. The operations also include determining that the airflow value exceeds a predetermined threshold. The operations further include determining a potential tampering event associated with the hardware device.

In accordance with certain embodiments, the airflow value is a value above zero. In some embodiments, the predetermined threshold is a value of zero. In certain embodiments, the operations include receiving test airflow data when the hardware device is powered on and when the hardware device is powered off, analyzing the test airflow data to determine airflow patterns when the hardware device is powered on and when the hardware device is powered off, and/or determining the predetermined threshold based on the airflow patterns.

In accordance with certain embodiments, determining the potential tampering event of the hardware device occurs while the hardware device is powered off. In some embodiments, the operations include storing information associated with the potential tampering event on a storage unit. In certain embodiments, the operations include communicating a notification to a cloud controller when the hardware device is powered on. The notification may include the information associated with the potential tampering event.

In accordance with certain embodiments, the airflow sensor installed inside of the hardware device is enclosed by a shield. In some embodiments, the shield is integrated into a cover of the hardware device.

In accordance with certain embodiments, the airflow sensor communicates the airflow data to a microcontroller unit (MCU) located inside of the hardware device. In some embodiments, the MCU communicates information associated with the potential tampering event to a storage unit located inside of the hardware device. In certain embodiments, the MCU, the airflow sensor, and the storage unit are powered by a battery located inside of the hardware device.

In accordance with certain embodiments, the operations include determining, at a current time of day, a current timestamp associated with the hardware device, wherein the timestamp is stored in a storage unit coupled to the airflow sensor. In some embodiments, the operations include comparing the current timestamp to the current time of day. In certain embodiments, the operations include determining, in response to comparing the current timestamp to the current time of day, whether a potential battery tampering event associated with a battery coupled to the airflow sensor has occurred.

According to another embodiment, a method includes receiving airflow data from an airflow sensor installed inside of a hardware device and determining an airflow value from the airflow data. The method also includes determining that the airflow value exceeds a predetermined threshold. The method further includes determining a potential tampering event associated with the hardware device.

According to yet another embodiment, one or more computer-readable non-transitory storage media embody instructions that, when executed by a processor, cause the processor to perform operations. The operations include receiving airflow data from an airflow sensor installed inside of a hardware device and determining an airflow value from the airflow data. The operations also include determining that the airflow value exceeds a predetermined threshold. The operations further include determining a potential tampering event associated with the hardware device.

Technical advantages of certain embodiments of this disclosure may include one or more of the following. This disclosure describes systems and methods for detecting hardware tampering using an airflow sensor. Certain embodiments detect tampering of a hardware device even when the hardware device is completely powered off, such as when an attacker has removed a cover on the hardware device's enclosure. Certain tamper detection systems and methods described herein detect physical access of the hardware device and identify specific changes or efforts to access the critical and secure interfaces of the hardware device. In certain embodiments, the tamper detection systems and methods notify potential tampering to software and/or end users, which allows the software and/or end user to take remedial actions on the next power-up of the system. In certain embodiments, the field-programmable gate array (FPGA) may initiate a safe mode of operation until users verify and/or reconfigure the system.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for detecting hardware tampering using an airflow sensor. Hardware tampering attacks may occur when the targeted system is completely powered off (e.g., disconnected from A/C power). For example, an attacker may remove the chassis cover on a hardware device to gain physical access of the system. Certain embodiments of this disclosure detect that a system has been tampered while the system was powered off.

FIG. 1 illustrates a system 100 for detecting hardware tampering using an airflow sensor, in accordance with certain embodiments. System 100 or portions thereof may be associated with an entity, which may include any entity, such as a business, company, or enterprise, that detects hardware tampering. In certain embodiments, the entity may be associated with a security organization, a financial organization, a retail center, a communications company, a networking hardware vendor, and the like. The components of system 100 may include any combination of hardware, firmware, and software. For example, the components of system 100 may use one or more elements of the computer system of FIG. 3. In the illustrated embodiment of FIG. 1, system 100 includes a network 110, a hardware device 120, a cover 122, an airflow sensor 130, airflow data 132, a shield 134, an MCU 140, an airflow value 142, a predetermined threshold 144, a storage unit 150, a potential tampering event 152, a power supply 160, a controller 170, and a user 180.

Network 110 of system 100 is any type of network that facilitates communication between components of system 100. Network 110 may connect one or more components of system 100. One or more portions of network 110 may include an ad-hoc network, the Internet, an intranet, an extranet, a portion of the public switched telephone network (PSTN), a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

Network 110 includes one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, workstations, switches, bridges, modems, hubs, and the like. In the illustrated embodiment of FIG. 1, nodes include hardware device 120, airflow sensor 130, MCU 140, and controller 170.

Hardware device 120 of system 100 is any electronic equipment that can receive, create, process, store, and/or communicate information. In certain embodiments, hardware device 120 is a computing device. Hardware device 120 may include one or more of the following types of devices: a hub, a switch, a router, a bridge, a gateway, a modem, a repeater, an access point, and the like. Hardware device 120 may include no fans or one or more fans. Hardware device 120 may be located in any suitable location to receive and communicate information to user 180 of system 100. For example, hardware device 120 may be located in a bank, in a retail center, in a storage warehouse, at an outside location (e.g., an automated teller machine (ATM) kiosk, a switch box, etc.), and the like. As another example, hardware device 120 may be located on a rack, on rails, under a desk, on a wall, on a desktop, etc.

Hardware device 120 of system 100 may include one or more hardware components. Hardware components may include one or more cases, towers, chassis, central processing units (CPUs), random access memories (RAMs), graphics processing units (GPUs), power supply units (PSUs), internal disk drives, optimal disk drives, computer data storages, sound cards, internal cooling systems (e.g., fans), motherboards, etc. The motherboard communicatively links the hardware components to allow these components to function together. In certain embodiments, the motherboard is a printed circuit board (PCB) that includes connectors into which other circuit boards can be slotted.

Cover 122 of hardware device 120 is a partial enclosure that helps protect the internal hardware components used for the operation of hardware device 120. Cover 122 may be any shape and/or size suitable to attach hardware device 120 to other components. Cover 122 may be made of metal, plastic, or any other suitable material. In certain embodiments, cover 122 is a chassis cover. Cover 122 may have any suitable number of surfaces. For example, cover 122 may include a top surface and four adjacent side surfaces similar to the shape of a box lid. In certain embodiments, cover 122 is attached to a main enclosure of hardware device 120 using one or more fasteners (e.g., screws, bolts, etc.). In certain embodiments, cover 122 may protect internal hardware components from damage, dust, hair, etc.

In the illustrated embodiment of FIG. 1, hardware device 120 includes airflow sensor 130. Airflow sensor 130 may be used to detect tampering associated with hardware device 120. Airflow sensor 130 is an instrument that is used to measure the flow of air. In certain embodiments, airflow sensor 130 measures the velocity of the air in accordance with a unit of measurement (e.g., linear feet per minute (LFM)). In some embodiments, airflow sensor 130 measures the air volume flowing past a particular point per unit of time in accordance with a unit of measurement (e.g., cubic feet per minute (CFM)). Airflow sensor 130 may be a type of mass flow sensor, wind speed sensor, anemometer (e.g., a hot wire anemometer), etc. In certain embodiments, airflow sensor 130 is a combination of two or more types of sensors (e.g., an airflow sensor, a pressure sensor, a Global Positioning System (GPS) sensor, a humidity sensor, etc.).

In the illustrated embodiment of FIG. 1, airflow sensor 130 is installed within hardware device 120. Airflow sensor 130 may be strategically placed within hardware device 120 near locations where tampering is more likely to occur. For example, airflow sensor 130 may be located adjacent to a CPU, a system-on-chip (SOC), a memory unit, and the like. In some embodiments, airflow sensor 130 is located within the vicinity of or integral with cover 122 to more readily detect airflow when cover 122 is removed from hardware device 120.

Airflow sensor 130 generates airflow data 132. Airflow data 132 is data associated with the flow (or absence of flow) of air. For example, airflow data 132 may indicate the presence or absence of airflow at airflow sensor 130. In some embodiments, airflow data 132 is used to detect the occurrence of an event (e.g., potential tampering event 152). Potential tampering event 152 is any potential event associated with hardware device 120 that is unauthorized, such as when cover 122 is removed from hardware device 120 or when cables, debuggers, or other hacker-friendly tools are inserted in hardware device 120 without permission. Potential tampering event 152 may occur when abnormal airflow patterns are detected in hardware device 120.

In certain embodiments, airflow sensor 130 is enclosed by shield 134. Shield 134 is a mechanical enclosure for one or more hardware components. Shield 134 may be used to protect (e.g., enclose or partially enclose) airflow sensor 130. In certain embodiments, shield 134 is made of metal (e.g., tin, brass, nickel, silver, stainless steel, etc.). Shield 134 may adopt conductive and/or magnetic materials to prevent electromagnetic interference (EMI) in hardware device 120. In some embodiments, shield 134 is connected to cover 122 of hardware device 120.

In the illustrated embodiment of FIG. 1, hardware device 120 includes MCU 140. MCU 140 may be used to detect tampering associated with hardware device 120. MCU is a small computer on a chip (e.g., a very large-scale integration (VLSI) integrated circuit (IC) chip). In certain embodiments, MCU includes one or more CPUs, memory units, programmable input/output peripherals, etc. MCU 140 may include one or more embedded applications. For example, MCU 140 may include an application for analyzing airflow data received from airflow sensor 130.

MCU 140 is communicatively coupled to airflow sensor 130. For example, MCU 140 may be communicatively coupled to airflow sensor 130 via one or more physical connections. In certain embodiments, MCU 140 receives airflow data 132 from airflow sensor 130. Airflow data 132 may include one or more airflow values 142. In some embodiments, MCU 140 analyzes airflow data 132 to determine one or more airflow values 142. Airflow values 142 represent a measure of airflow received by airflow sensor 130 at a particular moment in time. Airflow values 142 may be represented as a unit of measurement (e.g., LFM, CFM, etc.), an indication of whether airflow is present or not (e.g., a yes or a no indication), and the like.

In certain embodiments, MCU 140 compares airflow value 142 to predetermined threshold 144. Predetermined threshold 144 represents the minimum performance required to trigger potential tampering event 152. In certain embodiments, predetermined threshold 144 may be set to a particular airflow value (e.g., 0 LFM or 0.05 LFM), a particular indication (e.g., a yes indication), and the like. In some embodiments, predetermined threshold 144 may be determined based on airflow patterns. For example, MCU 140 may receive test airflow data when hardware device 120 is powered on/off, analyze the test airflow data to determine airflow patterns when hardware device is powered on and when the hardware device is powered on/off, and determine predetermined threshold 144 based on the airflow patterns. If airflow value 142 exceeds predetermined threshold 144, MCU 140 determines that potential tampering event 152 associated with hardware device 120 has occurred.

In the illustrated embodiment of FIG. 1, MCU 140 is communicatively coupled to storage unit 150. For example, MCU 140 may be communicatively coupled to storage unit 150 via one or more physical connections. In some embodiments, MCU 140 communicates information associated with tampering event 152 (e.g., airflow data 132, airflow value 142, predetermined threshold 144, one or more analyses performed by MCU 140, etc.) to storage unit 150. In certain embodiments, potential tampering event 152 may represent a potential tampering (e.g., removal or partial removal from its current location within hardware device 120) of cover 122, airflow sensor 130, MCU 140, storage unit 150 power supply 160, and the like. In some embodiments, potential tampering event 152 may include the insertion of cables, debuggers, or other hacker-friendly tools in hardware device 120.

Storage unit 150 of hardware device 120 represents storage that is separate from the main memory component of hardware device 120. Storage unit 150 may be used to detect tampering associated with hardware device 120. Storage unit 150 stores data received and/or generated by airflow sensor 130 and/or MCU 140. Storage unit 150 may include one or more different types of memory. For example, storage unit 150 may include flash memory (e.g., NOR flash and NAND flash), program memory, data memory, and the like. In some embodiments, storage unit 150 is integral with MCU 140.

In certain embodiments, airflow sensor 130, MCU 140, storage unit 150, and/or power supply 160 of hardware device 120 are associated with an internal clock. The internal clock may be set to a current time (e.g., a current time as established by the Coordinated Universal Time (UTC)). In certain embodiments, the internal clock generates timestamps that are communicated to storage unit 150. Timestamps are used to log events or a sequence of events. For example, MCU 140 may communicate timestamps to storage unit 150 upon the occurrence of authorized events (e.g., opening cover 122 of hardware device 120 for a maintenance repair, a system upgrade, etc.), upon the occurrence of unauthorized events (e.g., potential tampering event 152), periodically, upon boot-up, power-on, and/or power-off of hardware device 120, etc.

In certain embodiments, hardware device 120 includes power supply 160 that is separate from the main power supply of hardware device 120. Power supply 160 may be used to detect tampering associated with hardware device 120. Power supply 160 is an electrical device that supplies electric power to an electrical load. Power supply 160 may be an energy storage device such as a battery.

In certain embodiments, MCU 140 communicates a notification associated with potential tampering event 152 to a cloud controller when the hardware device is powered on. In certain embodiments, the notification may include one or more remedial actions. For example, the notification may inform user 180 to use the FPGA to initiate a safe mode of operation until user 180 verifies and/or reconfigures hardware device 120.

Controller 170 of system 100 is computer hardware and/or software (e.g., a computer program) that manages and/or directs the flow of data between different components of network 110. Controller 170 may include one or more cards, microchips, hardware devices, etc. In the illustrated embodiment of FIG. 1, controller 170 communicates with hardware device 120 when hardware device is powered on. For example, controller 170 may receive information from hardware device 120, such as information associated with one or more potential tampering events. As another example, controller 170 may communicate information to hardware device, such as information associated with one or more actions to take. Controller 170 may be located in a cloud, within proximity to hardware device 120, within hardware device 120, or in any other suitable location. Controller 170 may be communicatively coupled to hardware device via a wired or wireless connection.

User 180 of system 100 is a person who utilizes one or more components of system 100. User 180 may be a local user, a remote user, an administrator, a customer, a company, a combination thereof, and the like. In certain embodiments, user 180 is associated with one or more accounts. User 180 may be associated with an account name, a username, a login name, a screen name, one or more passwords, a user profile, etc. In certain embodiments, user 180 utilizes one or more applications downloaded to hardware device 120.

In certain embodiments, controller 170 may determine one or more timestamps associated with airflow sensor 130, MCU 140, storage unit 150, and/or power supply 160 of hardware device 120. For example, controller 170 may determine, at a current time of day, a current timestamp associated with the hardware device. Controller 170 may compare the current timestamp to the current time of day to determine whether potential tampering event 152 has occurred. For example, if the current timestamp and the current time of day do not match (e.g., the current timestamp represents a time prior to the current time of day), controller 170 may determine that potential tampering event 152 associated with storage unit 150 and/or power supply 160 has occurred.

In operation, airflow sensor 130, MCU 140, storage unit 150, and power supply 160 are physically attached inside hardware device 120 and communicatively coupled to each other. Airflow sensor 130 is installed inside of hardware device 120 and enclosed by shield 134. Shield 134 is integrated into cover 122 of hardware device 120. Power supply 160 provides power to airflow sensor 130, MCU 140, and storage unit 150 when hardware device 120 is powered off. MCU 140 receives airflow data 132 from airflow sensor 130 and determines airflow value 142 from airflow data 132. MCU 140 compares airflow value 142 to predetermined threshold 144 (e.g., an airflow value of 0 LFM). If airflow value 142 exceeds predetermined threshold 144, MCU 140 determines that potential tampering event 152 associated with hardware device 120 has occurred. MCU 140 stores information associated with potential tampering event in storage unit 150. At a later point in time, hardware device 120 is powered on. In response to hardware device 120 being powered on, MCU 140 communicates the information associated with potential tampering event 152 to controller 170. Controller 170 presents the information associated with potential tampering event 152, along with one or more actions, to user 180 of system 100. As such, system 100 detects tampering of hardware device 120 even when hardware device 120 is completely powered off.

Although FIG. 1 illustrates a particular number of networks 110, hardware devices 120, covers 122, airflow sensors 130, airflow data 132, shields 134, MCUs 140, airflow values 142, predetermined thresholds 144, storage units 150, potential tampering events 152, power supplies 160, controllers 170, and users 180, this disclosure contemplates any suitable number of networks 110, hardware devices 120, covers 122, airflow sensors 130, airflow data 132, shields 134, MCUs 140, airflow values 142, predetermined thresholds 144, storage units 150, potential tampering events 152, power supplies 160, controllers 170, and users 180. For example, system 100 may include more than one (e.g., 10, 50, 100, or 1000) hardware device 120. As another example, hardware device 120 may include more than one airflow sensor 130 and/or shield 134. A still another example, MCU 140 may generate more than one airflow value 142 and/or predetermined threshold 144. A yet another example, storage unit 150 may store more than one potential tampering event 152. As still another example, system 100 may include another controller 170 within hardware device 120.

Although FIG. 1 illustrates a particular arrangement of network 110, hardware device 120, cover 122, airflow sensor 130, airflow data 132, shield 134, MCU 140, airflow value 142, predetermined threshold 144, storage unit 150, potential tampering event 152, power supply 160, controller 170, and user 180, this disclosure contemplates any suitable arrangement of network 110, hardware device 120, cover 122, airflow sensor 130, airflow data 132, shield 134, MCU 140, airflow value 142, predetermined threshold 144, storage unit 150, potential tampering event 152, power supply 160, controller 170, and user 180. For example, controller 170 may be located within hardware device 120.

Furthermore, although FIG. 1 describes and illustrates particular components, devices, or systems carrying out particular actions, this disclosure contemplates any suitable combination of any suitable components, devices, or systems carrying out any suitable actions.

Figure 2:
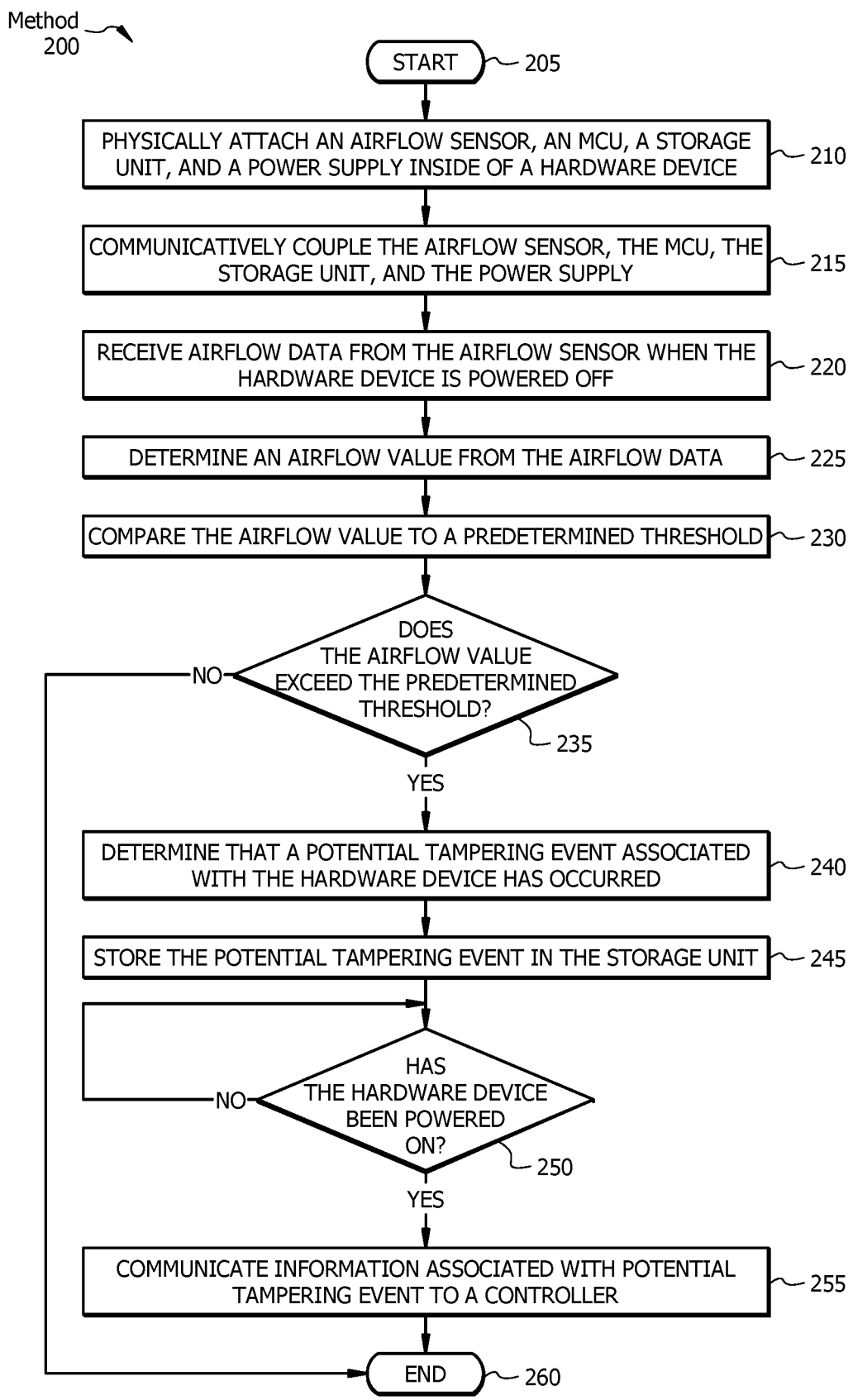
FIG. 2 illustrates a method for detecting hardware tampering using an airflow sensor, in accordance with certain embodiments.

FIG. 2 illustrates a method 200 for detecting hardware tampering using an airflow sensor, in accordance with certain embodiments. Method 200 of FIG. 2 may use one or more of the elements of FIG. 1. Method 200 begins at step 205. At step 210 of method 200, an airflow sensor, an MCU, a storage unit, and a power supply are physically attached inside a hardware device. For example, referring to FIG. 1, airflow sensor 130, MCU 140, storage unit 150, and power supply 160 may be physically attached inside hardware device 120. In certain embodiments, the airflow sensor is attached directly to the cover of the hardware device. In some embodiments, the airflow sensor is enclosed by a shield. Method 200 then moves from step 210 to step 215.

At step 215 of method 200, the airflow sensor, the MCU, the storage unit, and the power supply and communicatively coupled to each other. For example, referring to FIG. 1, airflow sensor 130 may be communicatively coupled to MCU 140, and MCU 140 may be communicatively coupled to storage unit 150 and power supply 160. The airflow sensor, the MCU, the storage unit, and the power supply are operational even when the hardware device is completely powered off. For example, the power supply may provide power to the airflow sensor, the MCU, and the storage unit when the hardware device is powered off. Method 200 then moves from step 215 to step 220.

At step 220 of method 200, the MCU receives airflow data from the airflow sensor. For example, referring to FIG. 1, airflow sensor 130 may actively collect airflow data 132 and communicate airflow data 132 to MCU 140. Method 200 then moves from step 220 to step 225, where the MCU determines an airflow value from the airflow data. For example, referring to FIG. 1, MCU 140 may analyze airflow data 132 to determine airflow value 142. Airflow value 142 may represent an air velocity (e.g., a distance traveled per unit of time), a volume flow (e.g., a volume of air flowing past a particular point per unit of time), an indication of whether airflow is present, and the like. Airflow value 142 may represent airflow data 132 captured in a single moment in time, an average of airflow data 132 captured over a predetermined amount of time, etc. Method 200 then moves from step 225 to step 230.

At step 230 of method 200, the MCU compares the airflow value to a predetermined threshold. For example, referring to FIG. 1, MCU 140 may compare airflow value 142 (e.g., an airflow value of 0 LFM, 5 LFM, etc.) to predetermined threshold 144 (e.g., an airflow value of 0 LFM). Method 200 then moves from step 330 to step 335, where the MCU determines whether the airflow value exceeds the predetermined threshold. If, at step 335, the MCU determines that the airflow value does not exceed the predetermined threshold (e.g., the airflow value and the predetermined threshold are both zero), method 200 advances from step 335 to step 360, where method 200 ends.

If, at step 235, the MCU determines that the airflow value exceeds the predetermined threshold (e.g., the airflow value is greater than zero and the predetermined threshold is zero), method 200 moves from step 235 to step 240, where the MCU determines that a potential tampering event associated with the hardware device has occurred. For example, referring to FIG. 1, MCU 140 may determine that potential tampering event 152 associated with hardware device 120 has occurred. Potential tampering event 152 may be a removal of the cover of the hardware device, a removal of the battery of the hardware device, and the like. Method 200 moves from step 240 to step 245.

At step 245 of method 200, the MCU stores the information associated with the potential tampering event in a storage unit. For example, referring to FIG. 1, MCU 140 may store information associated with potential tampering event 152 in storage unit 150. Method 200 moves from step 245 to step 250, where the MCU determines whether the hardware device has been powered on. If the hardware device has not been powered on, MCU continuously checks for power until the hardware device is powered on. Once the hardware device is powered on, method 200 moves from step 250 to step 255.

At step 255 of method 200, the MCU communicates the information associated with the potential tampering event to a controller. For example, referring to FIG. 1, MCU 140 may communicate the information associated with potential tampering event 152 to controller 170. The controller may be located inside the device or in a remote location (e.g., a cloud). The controller can then present the information associated with the potential tampering event, along with one or more actions, to the user of the hardware device. As such, method 200 detects tampering of a hardware device even when the hardware device is completely powered off.

Although this disclosure describes and illustrates particular steps method 200 of FIG. 2 as occurring in a particular order, this disclosure contemplates any suitable steps of method 200 of FIG. 2 occurring in any suitable order. Although this disclosure describes and illustrates an example method for detecting hardware tampering using an airflow sensor including the particular steps of the method of FIG. 2, this disclosure contemplates any suitable method for detecting hardware tampering using an airflow sensor including any suitable steps, which may include all, some, or none of the steps of the method of FIG. 2, where appropriate. Furthermore, although FIG. 2 describes and illustrates particular components, devices, or systems carrying out particular actions, this disclosure contemplates any suitable combination of any suitable components, devices, or systems carrying out any suitable actions.

Figure 3:
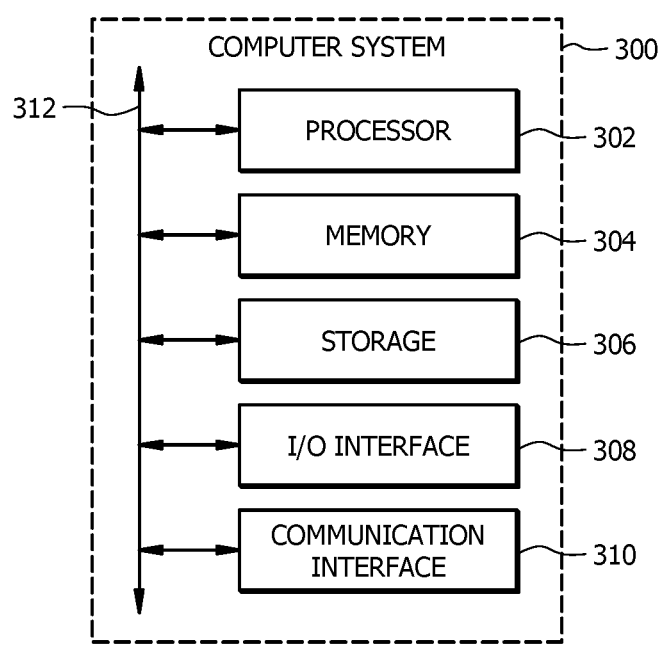
FIG. 3 illustrates a computer system that may be used by the systems and methods described herein, in accordance with certain embodiments.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, FPGAs or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network element, comprising:
one or more processors; and
one or more computer-readable non-transitory storage media coupled to the one or more processors and comprising instructions that, when executed by the one or more processors, cause the network element to perform operations comprising:
receiving airflow data from an airflow sensor installed inside of a hardware device;
determining an airflow value from the airflow data;
determining that the airflow value exceeds a predetermined threshold;
determining a potential tampering event associated with the hardware device;
receiving test airflow data when the hardware device is powered on and when the hardware device is powered off;
analyzing the test airflow data to determine airflow patterns when the hardware device is powered on and when the hardware device is powered off; and
determining the predetermined threshold based on the airflow patterns.

2. The network element of claim 1, wherein:
the airflow value is a value above zero; and
the predetermined threshold is a value of zero.

3. The network element of claim 1, wherein determining the potential tampering event of the hardware device occurs while the hardware device is powered off, the operations further comprising:
storing information associated with the potential tampering event on a storage unit; and
communicating a notification to a cloud controller when the hardware device is powered on, the notification comprising the information associated with the potential tampering event.

4. The network element of claim 1, wherein:
the airflow sensor installed inside of the hardware device is enclosed by a shield; and
the shield is integrated into a cover of the hardware device.

5. The network element of claim 1, wherein:
the airflow sensor communicates the airflow data to a microcontroller unit (MCU) located inside of the hardware device;
the MCU communicates information associated with the potential tampering event to a storage unit located inside of the hardware device; and
the MCU, the airflow sensor, and the storage unit are powered by a battery located inside of the hardware device.

6. The network element of claim 1, the operations further comprising:
determining, at a current time of day, a current timestamp associated with the hardware device, wherein the current timestamp is stored in a storage unit coupled to the airflow sensor;
comparing the current timestamp to the current time of day; and
determining, in response to comparing the current timestamp to the current time of day, whether a potential battery tampering event associated with a battery coupled to the airflow sensor has occurred.

7. A method, comprising:
receiving airflow data from an airflow sensor installed inside of a hardware device;
determining an airflow value from the airflow data;
determining that the airflow value exceeds a predetermined threshold;
determining a potential tampering event associated with the hardware device;
receiving test airflow data when the hardware device is powered on and when the hardware device is powered off;
analyzing the test airflow data to determine airflow patterns when the hardware device is powered on and when the hardware device is powered off; and determining the predetermined threshold based on the airflow patterns.

8. The method of claim 7, wherein:
the airflow value is a value above zero; and
the predetermined threshold is a value of zero.

9. The method of claim 7, wherein determining the potential tampering event of the hardware device occurs while the hardware device is powered off, further comprising:
storing information associated with the potential tampering event on a storage unit; and
communicating a notification to a cloud controller when the hardware device is powered on, the notification comprising the information associated with the potential tampering event.

10. The method of claim 7, wherein:
the airflow sensor installed inside of the hardware device is enclosed by a shield; and
the shield is integrated into a cover of the hardware device.

11. The method of claim 7, wherein:
the airflow sensor communicates the airflow data to a microcontroller unit (MCU) located inside of the hardware device;
the MCU communicates information associated with the potential tampering event to a storage unit located inside of the hardware device; and
the MCU, the airflow sensor, and the storage unit are powered by a battery located inside of the hardware device.

12. The method of claim 7, further comprising:
determining, at a current time of day, a current timestamp associated with the hardware device, wherein the current timestamp is stored in a storage unit coupled to the airflow sensor;
comparing the current timestamp to the current time of day; and
determining, in response to comparing the current timestamp to the current time of day, whether a potential battery tampering event associated with a battery coupled to the airflow sensor has occurred.

13. One or more computer-readable non-transitory storage media embodying instructions that, when executed by a processor, cause the processor to perform operations comprising:
receiving airflow data from an airflow sensor installed inside of a hardware device;
determining an airflow value from the airflow data;
determining that the airflow value exceeds a predetermined threshold;
determining a potential tampering event associated with the hardware device;
receiving test airflow data when the hardware device is powered on and when the hardware device is powered off;
analyzing the test airflow data to determine airflow patterns when the hardware device is powered on and when the hardware device is powered off; and
determining the predetermined threshold based on the airflow patterns.

14. The one or more computer-readable non-transitory storage media of claim 13, wherein:
the airflow value is a value above zero; and
the predetermined threshold is a value of zero.

15. The one or more computer-readable non-transitory storage media of claim 13, wherein determining the potential tampering event of the hardware device occurs while the hardware device is powered off, the operations further comprising:
storing information associated with the potential tampering event on a storage unit; and
communicating a notification to a cloud controller when the hardware device is powered on, the notification comprising the information associated with the potential tampering event.

16. The one or more computer-readable non-transitory storage media of claim 13, wherein:
the airflow sensor installed inside of the hardware device is enclosed by a shield; and
the shield is integrated into a cover of the hardware device.

17. The one or more computer-readable non-transitory storage media of claim 13, wherein:
the airflow sensor communicates the airflow data to a microcontroller unit (MCU) located inside of the hardware device;
the MCU communicates information associated with the potential tampering event to a storage unit located inside of the hardware device; and
the MCU, the airflow sensor, and the storage unit are powered by a battery located inside of the hardware device.

* * * * *